United States Patent
Chen et al.

(10) Patent No.: US 6,618,083 B1
(45) Date of Patent: Sep. 9, 2003

(54) MISMATCH-INDEPENDENT RESET SENSING FOR CMOS AREA ARRAY SENSORS

(75) Inventors: Zhiliang Julian Chen, Plano, TX (US); Eugene G. Dierschke, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/223,698

(22) Filed: Dec. 30, 1998

Related U.S. Application Data

(60) Provisional application No. 60/070,223, filed on Dec. 31, 1997.

(51) Int. Cl.[7] .................... H04N 3/14; H04N 5/335
(52) U.S. Cl. ......................... 348/243; 348/308
(58) Field of Search ................. 348/301, 302, 348/308, 243, 241

(56) References Cited

U.S. PATENT DOCUMENTS

| | | | |
|---|---|---|---|
| 4,407,010 A | | 9/1983 | Baji et al. |
| 5,296,696 A | | 3/1994 | Uno |
| 5,365,123 A | * | 11/1994 | Nakase et al. ............. 326/109 |
| 5,969,758 A | * | 10/1999 | Sauer et al. ............... 348/308 |
| 6,002,432 A | * | 12/1999 | Merrill et al. ............. 348/308 |
| 6,046,444 A | * | 4/2000 | Afghahi ..................... 348/308 |
| 6,246,436 B1 | * | 6/2001 | Lin et al. ................... 348/308 |
| 6,369,853 B1 | * | 4/2002 | Merrill et al. ............. 348/302 |
| 6,469,740 B1 | * | 10/2002 | Kuroda et al. ............. 348/308 |
| 6,476,864 B1 | * | 11/2002 | Borg et al. ................. 348/241 |

FOREIGN PATENT DOCUMENTS

EP    0 905 788 A    3/1999

OTHER PUBLICATIONS

Mangelsdorf et al., "A CMOS Front–End for CCD Cameras," Session 11/Electronic Imaging Circuits/Paper FA 11.5, p. 186, pp. 189–191.

Blanksby et al., "Noise Performance of a Color CMOS Photogate Image Sensor," IDEM '97, pp. 205–208.

* cited by examiner

Primary Examiner—Wendy R. Garber
Assistant Examiner—Jason Whipkey
(74) Attorney, Agent, or Firm—J. Dennis Moore; W. James Brady III; Frederick J. Telecky, Jr.

(57) ABSTRACT

Two methods for suppressing the fixed pattern noise effects of a pixel reset switch by ensuring that the reset NMOS device operates in its linear region. The first approach uses a separate reset switch supply voltage, $V_{RES}$, set to at least one threshold voltage below the sensing switch supply voltage, $V_{dd}$. The second approach uses a charge pump and level shifter to push the reset gate voltage at least one threshold voltage higher than a supply voltage common to both the reset and sense transistors.

5 Claims, 2 Drawing Sheets

MISMATCH-INDEPENDENT RESET SENSING FOR CMOS AREA ARRAY SENSORS

This application claims priority under 35 USC §119(e)(1) of provisional application Nos. 60/070,223 filed Dec. 31, 1997.

CROSS-REFERENCE TO RELATED APPLICATION

The present application has some Figures in common with, but is not necessarily otherwise related to, the following applications, which have common ownership and common effective filing dates with the present application: "Fast Frame Readout Architecture for Array Sensors with Integrated Correlated Double Sampling System" Serial No. 60/070,083 filed Dec. 31, 1997; and "Sequential Correlated Doubling Sampling Technique for CMOS Area Array Sensors" Serial No. 60/070,082 filed Dec. 31, 1997, now U.S. Pat. No. 6,248,991; both of which are herein incorporated by reference.

BACKGROUND AND SUMMARY OF THE INVENTION

The present application relates to CMOS imagers.

Background: CMOS Imagers

For the past 20 years or so, the field of optical sensing has been dominated by the charged couple device ("CCD"). However, CCD sensors have a number of problems associated with their manufacture and use. CCD imagers require a special manufacturing process which is incompatible with standard CMOS processing. Thus CCD imagers cannot be integrated with other chips that provide necessary support functions, but require independent support chips to perform, for example, CCD control, A/D conversion, and signal processing. The operation of a CCD imager also requires multiple high voltage supplies varying from, e.g. 5V to 12V. The higher voltages produce higher power consumption for CCD devices. Consequently, costs for both the CCD image sensor and ultimately the system employing the sensor, remain high.

The recent advances in CMOS technology have opened the possibility of imagers offering significant improvements in functionality, power, and cost of, for example, digital video and still cameras. Advances in chip manufacturing processes and reductions in supply voltages have encouraged revisitation of CMOS technology for use in image sensors. The advent of sub-micron CMOS technology allows pixels which contain several FETs, and are circuits in their own right, to be comparable in size to those existing on commercial CCD imagers. Fabrication on standard CMOS process lines permits these imagers to be fully integrated with digital circuitry to create single-chip camera systems. A CMOS area array sensor (or CMOS imager) can be fabricated with other system functions, e.g. controller, A/D, signal processor, and DSP. Hence, the cost of the CMOS process is more economical than that of the CCD process. CMOS imagers can operate with a single low supply voltage, e.g. 3.3V or 5V. This provides lower power consumption than CCD imagers.

Background: Fixed Pattern Noise

One significant disadvantage with CMOS imagers has previously limited their widespread application—Fixed Pattern Noise ("FPN"). FPN is a built-in characteristic of X-Y addressable devices and is particularly an issue with any sort of CMOS imaging chips. FPN is noise that appears in a fixed pattern because the noise level is related to the position of the pixel in the array, the geometry of the column bus, and the proximity of other noise sources. (In addition, there is purely random noise not correlated to the pixel position, but due to inherent characteristics of the detector.) The effect of FPN is like viewing a scene through a window made of photo negatives. FPN occurs when process limitations produce device mismatches and/or non-uniformities of the sensor during fabrication on a wafer. FPN consists of both pixel FPN and column FPN. Each pixel circuit comprises at least a photodiode and a sensing transistor (operating as source-follower) as shown in FIG. 3. Mismatches of the sensing transistor between pixels may produce different output levels for a given input optical signal. The variations of these output levels is called pixel FPN. Additionally, each column (or row) has separate read circuitry. Driver mismatches between different columns (or rows) produce column FPN. Most device mismatches are caused by threshold voltage ($V_T$) mismatches among CMOS transistors across the wafer.

A conventional solution for FPN suppression is to use a memory block to store the signal data for a whole frame and to subtract the FPN by sampling a reset voltage for the whole frame. The subtraction is done on a frame-by-frame basis which results in very slow frame rates.

Background: Correlated Double Sampling

Correlated Double Sampling ("CDS") plays an important role in removing several kinds of noise in high-performance imaging systems. Basically, two samples of the sensor output are taken. First, a reference sample is taken that includes background noise and noise derived from a device mismatch. A second sample is taken of the background noise, device mismatch, and the data signal. Subtracting the two samples removes any noise which is common (or correlated) to both, leaving only the data signal. However, sensing the threshold voltage ($V_T$) of the sensing transistor, is a problem. CDS is discussed in greater detail in a paper by Chris Mangelsdorf, Analog Devices, Inc., 1996 IEEE International Solid-State Circuits Conference, and is hereby incorporated by reference.

Mismatch Effects of a Non-ideal Pixel Reset Switch

No solutions currently exist for suppressing FPN caused by the mismatch effects of an NMOS reset switch in CMOS imagers. In silicon fabrication, an NMOS switching device with minimum size is normally used as the reset switch in order to obtain minimum pixel size for good image resolution, and to minimize parasitic capacitances. Variations in the device threshold voltages, $V_T$, and sizes of the NMOS switching devices when fabricated in a wafer can be a large source of FPN. The effects are similar to the FPN caused by the variations of pixel-sensing NMOS transistors in a CMOS imager, without a Sequential CDS implementation ("SCDS").

Mismatch-Independent Reset Sensing for CMOS Imagers

The present application discloses a technique for suppressing fixed pattern noise derived from a pixel reset switch. The Mismatch Independent Reset Sensing ("MIRS") technique disclosed in this application enables reset-switch sensing in SCDS or CDS architectures to be independent of NMOS switching device variations. This is achieved by ensuring that the reset switch always operates in its linear region when turned ON. Therefore, even if mismatch effects exist in an NMOS reset switching device, the mismatch effect will not produce FPN on the pixel readout.

An advantage is that the reset switch mismatch effects in a CMOS area array sensor will not produce FPN at the output by using MIRS technique. Another advantage is that the MIRS, together with the SCDS technique, can suppress FPN from ⅟25 to ⅟20 the level when not implementing the innovative technique. Therefore, wide-spread application of CMOS imagers can be realized by using the SCDS/MIRS technique. Another advantage is that the technique can be easily integrated with other CDS techniques. Another advantage is that the innovative method provides a fully-integrated and low-cost solution to where a single chip incorporates all the necessary digital circuits for the CMOS imager system.

BRIEF DESCRIPTION OF THE DRAWING

The disclosed inventions will be described with reference to the accompanying drawings, which show important sample embodiments of the invention, wherein.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Conventional Pixel Sampling Using CDS

Figure 3:
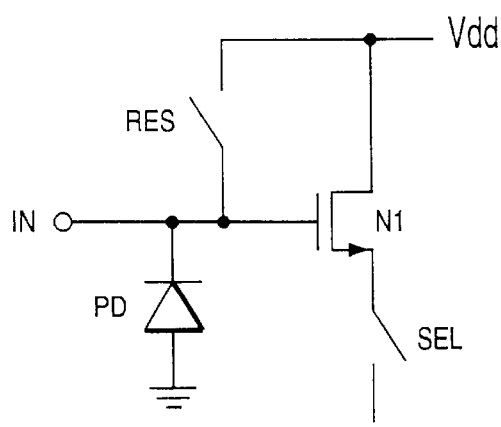
FIG. 3 shows a typical pixel circuit configuration.

Two different types of sensors can be realized in CMOS technology. These are passive and active pixel sensors. The difference between these two types is that a passive pixel does not perform signal amplification whereas an active pixel does. A passive-pixel sensor is simply a photodiode (MOS or p-n junction diode) with a transistor that passes photoelectrically generated signal charge to an amplifier outside the pixel array. FIG. 3 shows a typical active-pixel sensor circuit. The gate of transistor N1 is connected to a reset switch RES and the cathode of a photodiode PD. Initially, the reset switch RES is open and the voltage at node IN approximates the voltage generated by the photodiode, $V_{PD}$. A finite charge exists at node IN which is dependent on both the capacitances of the photodiode PD and gate of the NMOS transistor N1. When select switch SEL is closed, the voltage at node IN is read from the pixel circuit, less a threshold voltage $V_T$. When reset switch RES is closed, the voltage at node IN rises to approximately $V_{dd}$. The voltage at node IN is again read from the pixel circuit. Subtracting the two samples removes any noise which is common (or correlated) to both, leaving only the data signal. However, this approach does not suppress the mismatch effect caused by a non-ideal reset switch RES since the switch is outside of the double-sampling path.

MIRS Technique: $V_{RES}$ below $V_{dd}$

Figure 1:
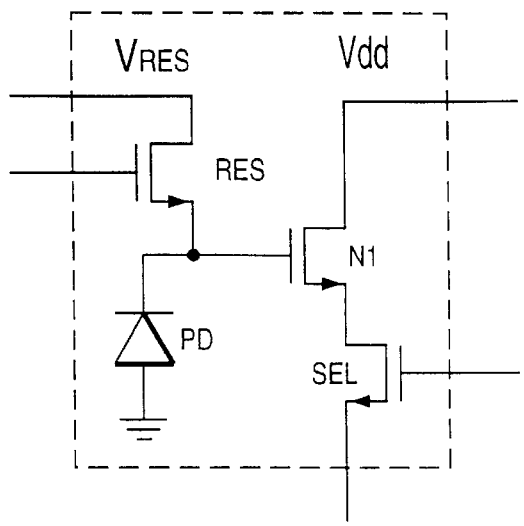
FIG. 1 shows a first embodiment for suppressing FPN from a non-ideal reset switch.

Two approaches to solving this problem are disclosed in this application. The basic concept of MIRS is to force the NMOS reset switching device RES to always operate in its linear region when it turns ON. FIG. 1 shows a first embodiment for suppressing FPN from a non-ideal reset switch. The drain of the transistor reset switch RES is connected to a reset voltage source, $V_{RES}$, which is independent of $V_{dd}$. Voltage $V_{RES}$ should be set less than $V_{dd}$ by at least one $V_T$, the threshold voltage, (including backgate bias effect) plus delta($V_T$) (the maximum $V_T$ variation for a given process), for all operational conditions (for example, a wide temperature range, bright-light sensing, and dark sensing).

Thus, $$V_{RES} < V_{dd} - (V_T + \text{delta}(V_T)).$$

During normal switching operations, the gate of the reset transistor RES is switched between a low voltage and $V_{dd}$ to turn transistor RES OFF and ON, respectively. When the gate voltage of transistor RES is approximately $V_{dd}$, transistor RES is operating in its linear region (the difference of $V_{dd}$ and $V_{RES}$ is at least one $V_T$, which is sufficient to operate transistor RES in its linear region). In linear mode, the source or gate voltage of the pixel-sensing transistor N1 can be pulled up to the transistor RES drain voltage, $V_{RES}$. The drain voltage is equal to $V_{RES}$, no matter what the fabricated size of transistor RES, or the associated $V_T$ voltage variation. Therefore, all pixel-sensing NMOS transistors N1 in a CMOS imager are able to sense the exact same $V_{RES}$ voltage during the reset phase, regardless of the wide variations in threshold voltages inherent across the large number of reset switches fabricated in the pixel circuits of the imager. Therefore the mismatch effect of the reset switching transistor RES is significantly reduced and hence FPN on the pixel readout is also significantly reduced.

MIRS Technique: Reset Switch Gate Voltage $V_{gh}$ Above $V_{dd}$

Figure 2:
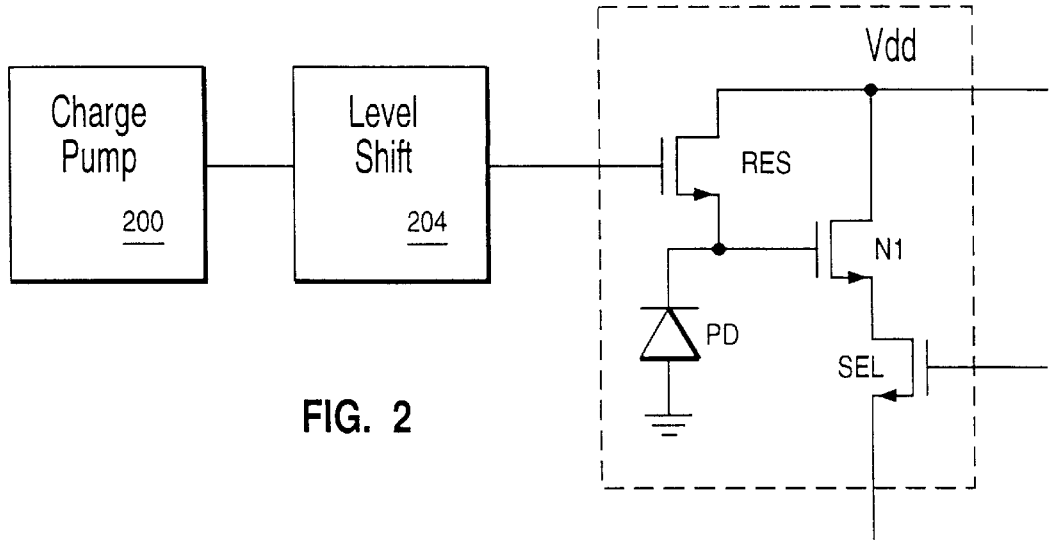
FIG. 2 shows a second embodiment for suppressing FPN from a non-ideal reset switch.

FIG. 2 shows a second embodiment for suppressing FPN from a non-ideal reset switch. This approach connects the drain of the reset switching transistor RES to $V_{dd}$ (which is also connected to the drain of pixel-sensing transistor N1). To ensure that the reset transistor RES operates in its linear region, the gate voltage $V_g$ of transistor RES is set higher than the $V_{dd}$, at least one $V_T$ (including backgate bias effect) plus delta($V_T$) (the maximum $V_T$ variation for a given process), for all operational conditions (for example, a wide temperature range, bright-light sensing, and dark sensing). Thus the higher gate voltage, $V_{gh}$, of the reset transistor RES is derived as follows, $$V_{gh} > V_{dd} + (V_T + \text{delta}(V_T)).$$

To eliminate the need for another voltage supply for such an implementation, a charge pump circuit 200 is added to obtain the higher gate voltage level, $V_{gh}$. A level-shift circuit 204 is connected between the charge pump 200 and pixel circuits 204 to increase the input gate voltage level of transistor RES from $V_{dd}$ to $V_{gh}$. With this implementation, all pixel-sensing transistors N1 in a CMOS imager are able to sense the exact same $V_{dd}$ voltage during the reset phase. Therefore the mismatch effect of the reset transistor RES will not produce FPN during readout of the pixel.

In the first approach, the reset voltage $V_{RES}$ is derived independently of the supply voltage $V_{dd}$, and consequently, an additional line is needed for the pixel circuit. Therefore the area of the pixel in the first approach is slightly larger than the area of the pixel in the second approach. Hence the optical fill factor (the percentage of area in the array actually used for sensing) in the first approach will be smaller than that in the second approach for pixels of equal size.

In the second approach, both the charge pump 200 and level shift 204 circuits are implemented outside of the pixel circuit. Therefore a higher optical fill factor can be achieved than that of the first approach. Additionally, the charge pump circuit 200 may not be required in a dual 3.3V/5V power supply CMOS process. For such a process, the higher gate voltage, $V_{gh}$, can be set directly to be 5V while the $V_{dd}$ is 3.3V.

Imaging Chip

Figure 4:
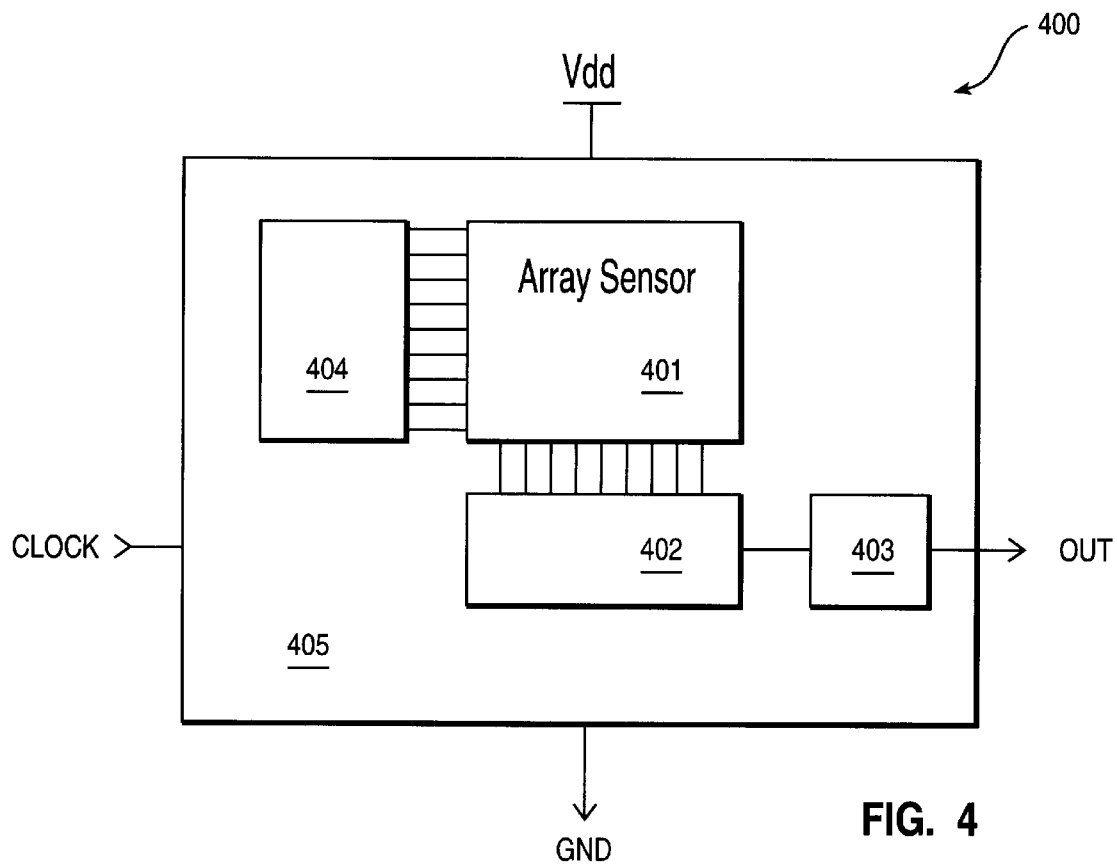
FIG. 4 shows an integrated circuit imaging chip using the innovative readout architecture.

FIG. 4 shows an imager chip comprising the innovative sampling architecture. The chip 400 incorporates a row select circuitry 404 and column select circuitry 402 to read the array sensor 401. The output circuitry 403 receives pixel data from the column circuitry 402 and presents it to the output terminal OUT. Additional support circuitry may be fabricated in the peripheral region 405. The chip 400 also has connections for supply voltage VDD, ground GND, and clocking signals CLOCK.

Camera Imaging System

Figure 5:
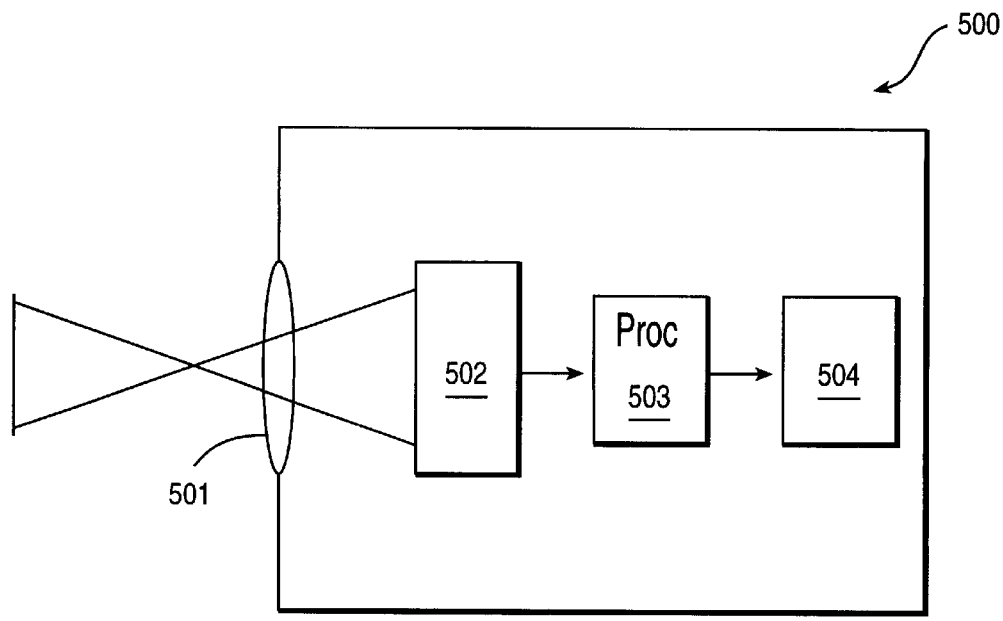
FIG. 5 shows a camera using an integrated circuit imaging chip using with the innovative readout architecture.

FIG. 5 shows a camera using an integrated circuit imaging chip using with the innovative readout architecture. The camera 500 has a lens 501 which focuses an image onto the image sensor chip 502. A processor 503 receives the data from the image chip 503 and sends it to a storage and output system 504.

According to a disclosed class of innovative embodiments, there is provided: A method for operating a pixel circuit in a photosensing integrated circuit, comprising the steps of: turning on a reset transistor, using a reset gate voltage which is more in magnitude than any source/drain voltage of said reset transistor by a value of at least the sum of one threshold voltage plus the maximum threshold variation of the given process; and, after turning off said reset transistor, allowing a photosensing device to apply a illumination-dependent current to one of said source/drain terminals of a sensing transistor for a desired integration time; and thereafter sensing the voltage on said one source/drain terminal of said reset transistor.

According to another disclosed class of innovative embodiments, there is provided: A method for operating a photosensing device, comprising the steps of: providing a first supply voltage to a reset transistor, and turning on said reset transistor with a reset gate voltage which is approximately equal to a second supply voltage which exceeds in magnitude said first supply voltage; wherein said first supply voltage is always less in magnitude than said second supply voltage by at least the sum of one threshold voltage plus the maximum threshold variation of the given process; and wherein said reset transistor is connected to apply an initial voltage, which is precisely equal to said first supply voltage, regardless of the threshold voltage of said reset transistor, to the gate of a sensing transistor; and allowing a photosensing device to apply a illumination-dependent current to said gate of said sensing transistor for a desired integration time; and sensing current passed by said sensing transistor.

According to another disclosed class of innovative embodiments, there is provided: A pixel circuit, comprising: a photosensing subcircuit; and a plurality of active devices per said pixel circuit, comprising a reset transistor, a sensing transistor, and a selecting transistor; wherein said reset and sensing transistors receive first and second supply voltages, respectively; wherein said reset transistor intermittently receives a reset gate voltage which is equal to said second supply voltage; wherein said first supply voltage is always less in magnitude than said second supply voltage by at least the sum of one threshold voltage plus the maximum threshold variation of the given process; wherein said reset circuit operates in either a linear mode or an off mode, in dependence on said reset gate voltage; wherein said selecting transistor switches to either select a photosensing voltage or said first supply voltage.

According to another disclosed class of innovative embodiments, there is provided: A photosensing imaging system, comprising:a focusing element; an integrated imager circuit, comprising: a plurality of pixel circuits comprising active devices; said active devices comprising a reset transistor, a sensing transistor, and a selecting transistor; wherein said reset and sensing transistors receive first and second supply voltages, respectively; wherein said reset transistor intermittently receives a reset gate voltage which is equal to said second supply voltage; wherein said first supply voltage is always less in magnitude than said second supply voltage by at least the sum of one threshold voltage plus the maximum threshold variation of the given process; wherein said reset circuit operates in either a linear mode or an off mode, in dependence on said reset gate voltage; wherein said selecting transistor switches to either select a photosensing voltage or said first supply voltage; and pixel readout circuitry; a processor connected to control said imager; and a storage medium for receiving and storing data from said imager.

According to another disclosed class of innovative embodiments, there is provided: A pixel circuit, comprising: a photosensing subcircuit; and a plurality of active devices per said pixel circuit, comprising a reset transistor, a sensing transistor, and a selecting transistor; wherein said reset and sensing transistors receive a common supply voltage; wherein said reset transistor turns on with a reset gate voltage which exceeds said common supply voltage in magnitude by at least the sum of one threshold voltage plus the maximum threshold variation of the given process; wherein said reset transistor operates in either a linear mode or an off mode, in dependence on said reset gate voltage; wherein said selecting transistor switches to select either a photosensing voltage or said common supply voltage.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

For example, as will be obvious to those of ordinary skill in the art, other circuit elements can be added to, or substituted into, the specific circuit topologies shown.

For another example, within the constraints well-known to those of ordinary skill, nonlinear devices can be added in series with (or used to replace) resistors, to increase the impedance of load devices.

For another example, within the constraints well-known to those of ordinary skill, a variety of well-known current mirror configurations can be substituted for those shown.

For another example, within the constraints well-known to those of ordinary skill, a variety of well-known amplifier configurations can be substituted for those shown.

For another example, within the constraints well-known to those of ordinary skill, the innovative technique can be used in reduced voltage array architectures.

What is claimed is:

1. A method for operating a pixel circuit in a photosensing integrated circuit fabricated using a predetermined process, comprising the steps of:

(a.) turning on a reset transistor, using a reset gate voltage which is more in magnitude than any source/drain voltage of said reset transistor by a value of at least the sum of one threshold voltage plus the maximum threshold variation of the predetermined process; and, after turning off said reset transistor, (b.) allowing a photosensing device to apply a illumination-dependent current to one of a source/drain terminals of a sensing transistor for a desired integration time; and thereafter (c.) sensing the voltage on said one source/drain terminal of said reset transistor, wherein said sensing transistor and said reset transistor comprise NMOS devices.

2. A method for operating a photosensing device in a pixel circuit fabricated using a predetermined process, comprising the steps of:

(a.) providing a first supply voltage to a reset transistor, and turning on said reset transistor with a reset gate voltage which is approximately equal to a second supply voltage which exceeds in magnitude said first supply voltage;

wherein said first supply voltage is always less in magnitude than said second supply voltage by at least the sum of one threshold voltage plus the maximum threshold variation of the predetermined process;

and wherein said reset transistor is connected to apply an initial voltage, which is precisely equal to said first supply voltage, regardless of the threshold voltage of said reset transistor, to the gate of a sensing transistor; and (b.) allowing a photosensing device to apply a illumination-dependent current to said gate of said sensing transistor for a desired integration time; and (c.) sensing current passed by said sensing transistor, wherein said threshold voltage variation also comprises backgate bias effects of said reset transistor.

3. A pixel circuit fabricated using a predetermined process, comprising:

a photosensing subcircuit; and a plurality of active devices per said pixel circuit, comprising a reset transistor, a sensing transistor, and a selecting transistor; wherein said reset and sensing transistors receive first and second supply voltages, respectively; wherein said reset transistor intermittently receives a reset gate voltage which is equal to said second supply voltage; wherein said first supply voltage is always less in magnitude than said second supply voltage by at least the sum of one threshold voltage plus the maximum threshold variation of the predetermined process; wherein said reset transistor operates in either a linear mode or an off mode, in dependence on said reset gate voltage; wherein said selecting transistor switches to either select a photosensing voltage or said first supply voltage, wherein said sensing transistor, said reset transistor, and said selecting transistor comprise NMOS devices.

4. A photosensing imaging system, comprising:

a focusing element;

an integrated imager circuit fabricated using a predetermined process, comprising:

a photosensing subcircuit;

a plurality of pixel circuits comprising active devices; said active devices comprising a reset transistor, a sensing transistor, and a selecting transistor; wherein said reset and sensing transistors receive first and second supply voltages, respectively; wherein said reset transistor intermittently receives a reset gate voltage which is equal to said second supply voltage; wherein said first supply voltage is always less in magnitude than said second supply voltage by at least the sum of one threshold voltage plus the maximum threshold variation of the predetermined process; wherein said reset transistor operates in either a linear mode or an off mode, in dependence on said reset gate voltage; wherein said selecting transistor switches to either select a photosensing voltage or said first supply voltage; and pixel readout circuitry;

a processor connected to control said imager; and a storage medium for receiving and storing data from said imager, wherein said sensing transistor, said reset transistor, and said selecting transistor comprise NMOS devices.

5. A pixel circuit fabricated using a predetermined process, comprising:

a photosensing subcircuit; and a plurality of active devices per said pixel circuit, comprising a reset transistor, a sensing transistor, and a selecting transistor; wherein said reset and sensing transistors receive a common supply voltage; wherein said reset transistor turns on with a reset gate voltage which exceeds said common supply voltage in magnitude by at least the sum of one threshold voltage plus the maximum threshold variation of the predetermined process; wherein said reset transistor operates in either a linear mode or an off mode, in dependence on said reset gate voltage; wherein said selecting transistor switches to select either a photosensing voltage or said common supply voltage, wherein said threshold voltage variation also comprises backgate bias effects of said reset transistor.

* * * * *